(12) United States Patent
Martin et al.

(10) Patent No.: US 8,139,298 B2
(45) Date of Patent: Mar. 20, 2012

(54) OPTICALLY MEASURABLE MOUNTING STRUCTURE

(75) Inventors: Chadwick B. Martin, Tucson, AZ (US); Kenneth E. Schmidt, Tucson, AZ (US)

(73) Assignee: Raytheon Company, Waltham, MA (US)

(*) Notice: Subject to any disclaimer, the term of this patent is extended or adjusted under 35 U.S.C. 154(b) by 120 days.

(21) Appl. No.: 12/417,258

(22) Filed: Apr. 2, 2009

(65) Prior Publication Data

US 2010/0254030 A1  Oct. 7, 2010

(51) Int. Cl.
G02B 7/02 (2006.01)

(52) U.S. Cl. .................................................. 359/819

(58) Field of Classification Search .......... 359/811, 359/819, 820; 353/100; 362/455; 396/529
See application file for complete search history.

(56) References Cited

U.S. PATENT DOCUMENTS

| 6,922,293 B2 * | 7/2005 | Watson et al. | 359/819 |
| 2008/0225255 A1 * | 9/2008 | Margeson et al. | 355/67 |

FOREIGN PATENT DOCUMENTS

EP  0 587 284  3/1994

OTHER PUBLICATIONS

International Search Report and Written Opinion of the International Search Authority for corresponding International Application No. PCT/US2010/029543, dated Sep. 13, 2010.
International Preliminary Report on Patentability for corresponding International Application No. PCT/US2010/029543, dated Jun. 27, 2011.

* cited by examiner

*Primary Examiner* — Joseph P Martinez
(74) *Attorney, Agent, or Firm* — Renner, Otto, Boisselle & Sklar, LLP (57) ABSTRACT

A mount between an optical element and a housing includes an optical element that has an optical element mount with plural optical element mounting pads and an optical element connecting surface that links the optical element mounting pads together. The housing includes a housing mount that has plural housing mounting pads and a housing connecting surface that links the housing mounting pads together. The optical element mount and the housing mount are mounted to one another such that the only contact between the optical element and the housing is between the mounting pads of each respective element.

25 Claims, 6 Drawing Sheets

FIG. 1

Prior Art

OPTICALLY MEASURABLE MOUNTING STRUCTURE

GOVERNMENT INTERESTS

This invention was made under U.S. Government Contract N00024-03-C-6111 awarded by the Naval Sea Systems Command. The Government has certain rights in this invention.

FIELD OF THE INVENTION

The application is in the field of mounting structures, and more particularly to an optically measurable mounting structure.

DESCRIPTION OF THE RELATED ART

Any object in three-dimensional space can be defined by six independent coordinates (also referred to as six degrees of freedom), i.e., three translational coordinates (x, y, z) and three rotational coordinates (roll, pitch, yaw). An object can be mounted to another object with a semi-kinematic mount, which allows an object to be located according the six degrees of freedom. A semi-kinematic mount includes finite areas of contact or mounting pads between the objects.

Errors or defects in the flatness of the mounting pads and the coplanarity of the mounting pads relative to one another may cause deviations in the final position of the mounted object or may distort the shape of the mounted object. For example, flatness or coplanarity errors in the mounting areas may cause the mounted element to be tilted or otherwise misaligned when it is mounted to the housing. Furthermore, the mounted element may be secured with a mechanical fastener or restraint, and loads or torque from the mechanical fastener or restraint may affect the final position and optical figure of the mounted element.

Improvements over such semi-kinematic mounts would generally be desirable.

SUMMARY OF THE INVENTION

Figure 1:
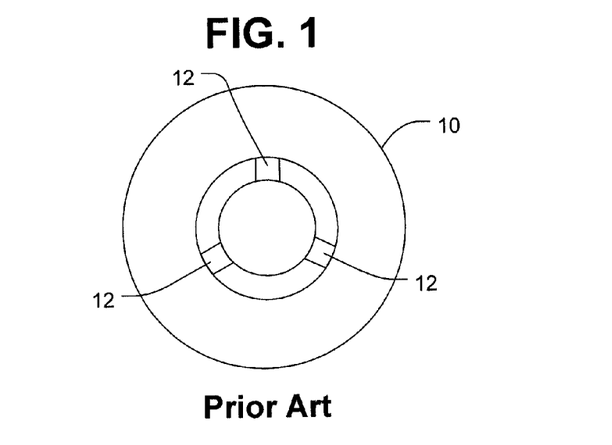
FIG. 1 is an exemplary embodiment of a prior art mounting element.

Prior art mounting elements, such as the element 10 depicted in FIG. 1, typically include three separate mounting pads 12, 14, 16. The surface of the mounting pads 12, 14, 16 and the position of the pads 12, 14, 16 relative to one another typically must be measured mechanically, which generally limits the tolerances to which the mounts can be manufactured. For example, mechanically measurable tolerances may limit the ability of a manufacturer to accurately and precisely measure the axial position and planarity of the pads relative to one another. Furthermore, attempts to increase tolerances beyond those that can be mechanically measured may lead to high mounting distortions and errors.

To overcome at least some of the drawbacks of other mounts, a mount with an optically measurable mounting surface is described below. The mounting surface of each element in the mount includes a plurality of mounting pads linked by a connecting surface. The mounting pads and connecting surface have a smooth surface. For example, the surface may have an optical finish that can be analyzed with an optical inspection system, such as an interferometer. The connecting surface and mounting pads may be a highly reflective or mirror-like surface. The axial position and coplanarity of the mounting pads relative to one another can therefore be measured very accurately, and the tolerances to which the mounts can be manufactured can be tightened over mechanically measurable tolerances.

According to an aspect of the invention, an optical mount includes an optical element that includes an optical element mount that includes plural optical element mounting pads and an optical element connecting surface that links the optical element mounting pads together, a housing that includes a housing mount that includes plural housing mounting pads and a housing connecting surface that links the mounting pads together, wherein the optical element mount is in contact with the housing mount and the contact between the optical element mount and the housing mount only occurs at the mounting pads.

According to another aspect of the invention, a mount includes a mounting element that includes a plurality of mounting element mounting pads connected by a mounting element connecting surface, wherein the mounting element connecting surface and the plurality of mounting element mounting pads form a substantially continuous surface, and a housing element that includes a plurality of housing element mounting pads connected by a housing element connecting surface, wherein the housing connecting element surface and the plurality of housing element mounting pads form a substantially continuous surface, wherein the mounting element mounting pads are in contact with the housing element mounting pads, and the mounting element connecting surface is spaced from the housing element connecting surface.

According to another aspect of the invention, a semi-kinematic mount includes a housing having a substantially planar housing mount that includes a number of housing mounting pads and an optical element having a substantially planar mounting surface that includes a number of optical element mounting pads, wherein the housing mounting pads and the optical element mounting pads are in contact with one another when the optical element is mounted to the housing.

The foregoing and other features of the invention are hereinafter fully described and particularly pointed out in the claims, the following description and the annexed drawings setting forth in detail several illustrative embodiments of the invention, such being indicative, however, of but a few of the various ways in which the principles of the invention may be employed.

BRIEF DESCRIPTION OF THE DRAWINGS

In the annexed drawings, which are not necessarily to scale.

DETAILED DESCRIPTION

The mounts described herein include a plurality of mounting pads connected or linked to one another by a connecting surface. The mounting pads and connecting surface form a continuous surface from which the planarity and the axial position of the mounting pads relative to one another can be measured optically. Accordingly, the mount can be manufactured to tighter tolerances than mounts that are limited by mechanically measured tolerances.

Figure 2:
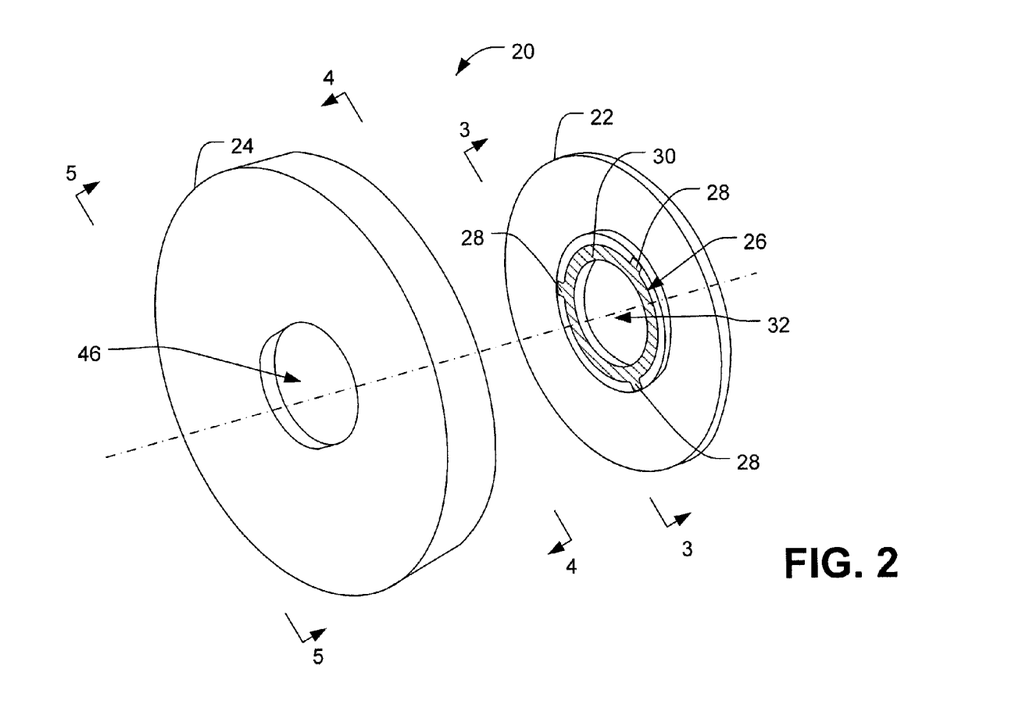
FIG. 2 is an exploded view of a mount according to aspects of the present invention.

Referring initially to FIG. 2, an exploded view of an exemplary embodiment of the mount 20 is shown. The mount 20 includes a first element 22 and a second element 24. For clarity, the following description primarily refers to the first element 22 as an optical element and the second element 24 as a housing or housing element. It should be appreciated that these terms are not intended to be limiting, and that the first element 22 and the second element 24 are representative of any two objects that can be mounted together. For example, the concepts described herein may be applied to any reflective or catadioptric opto-mechanical system where one mirror is mounted to another mirror. The concepts also are applicable to optical and non-optical systems and accordingly may be used to mount any two objects together. For example the concepts described herein may be used for astronomical telescopes, telephoto camera lenses, spotting scopes, monolithography projection optics, microscope objectives, or molded plastics, etc.

Figure 3:
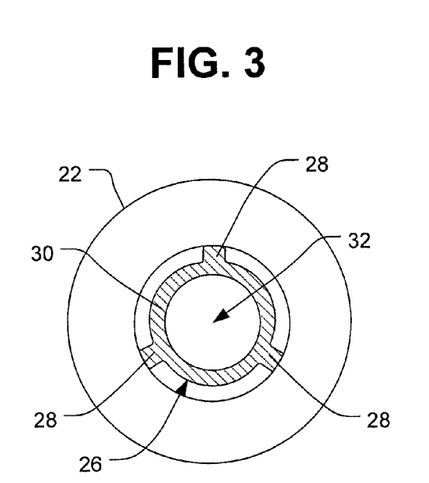
FIG. 3 is a side view of an optical element in the mount of FIG. 2 looking generally in the direction of arrows 3-3 in FIG. 2.

With additional reference to FIG. 3, the optical element 22 is shown in more detail. The optical element 22 has an optical element mount 26 that includes plural optical mounting pads 28 that are linked or connected together with a connecting surface 30. The mounting pads 28 and the connecting surface 30 form a continuous (or monolithic) surface, as indicated by the hatched portion of FIGS. 2 and 3. The surface of the optical element mount 26 is substantially planar or smooth such that the surface of the optical element mount 26 can be characterized or inspected by an optical inspection system, such as an interferometer.

In the embodiment of FIGS. 2-3, the optical element connecting surface 30 is an annular surface or annulus. The optical element mounting pads 28 are axisymmetrically spaced around the annulus and extend radially outward from the annulus. The optical element 22 also may include a hole 32 through which light may pass or be reflected. A mirror, lens, or other object may be integrated with or mounted on the optical element as described in more detail below.

Figure 4:
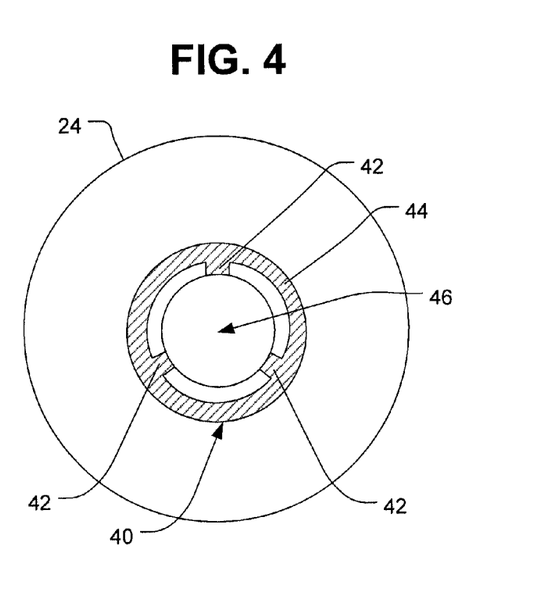
FIG. 4 is a view of a housing element in the mount of FIG. 2 looking generally in the direction of arrows 4-4 in FIG. 2.

The housing element 24 is shown in more detail in FIG. 4. The housing element 24 has a housing mount 40 that includes a plurality of housing mounting pads 42 and a connecting surface 44 that links or connects the housing mounting pads 42 together. Similar to the optical mount 26, the mounting pads 42 and the connecting surface 44 on the housing 24 form a continuous (or monolithic) surface, as indicated by the hatched portion of FIG. 4. The surface of the housing mount 40 also is substantially planar such that the surface of the housing mount 40 can be optically inspected.

As shown in FIG. 4, the housing connecting surface 44 is an annular surface, such as an annulus, and the housing mounting pads 42 are axisymmetrically spaced around the connecting surface 44. The housing mounting pads 42 extend radially inward from the housing connecting surface 44.

The optical element mounting pads 28 and the housing element mounting pads 42 are spaced the same distance from one another such that the mounting pads 28, 42 on each element 22, 24 are aligned with one another when the optical element 22 is mounted to the housing 24. In the embodiment of FIGS. 2-4, the optical element 22 and the housing 24 each include three mounting pads, however, it will be appreciated that one or both of the optical element 22 and the housing 24 may include more than three mounting pads. For example, if high dynamic stresses are expected, it may be desirable to include four or more planar mounting pads, which must be substantially planar with one another to avoid imparting large mounting distortions into the optics. Thus, when contact stresses between the mounting pads become unacceptable for the application due to the environment in which the mount is used, it may be necessary to increase the contact area between mounting pads of the optical element and housing, by either adding additional mounting pads or by increasing the area of the three pads in order to distribute the loads over a larger area and reduce the stress.

In the illustrated embodiment, the mounting pads 28, 42 are axisymmetrically spaced from one another about each of the annuli, e.g., a mounting pad is located every 120 degrees. Although the mounting pads are illustrated as being axisymmetric, it will be appreciated that the mounting pads on the housing may be spaced in any non-linear configuration, including a non-axisymmetric orientation. For example, the mount pads may be non-symmetric, for example, located at 100°, 110°, and 150°, etc.).

Figure 5:
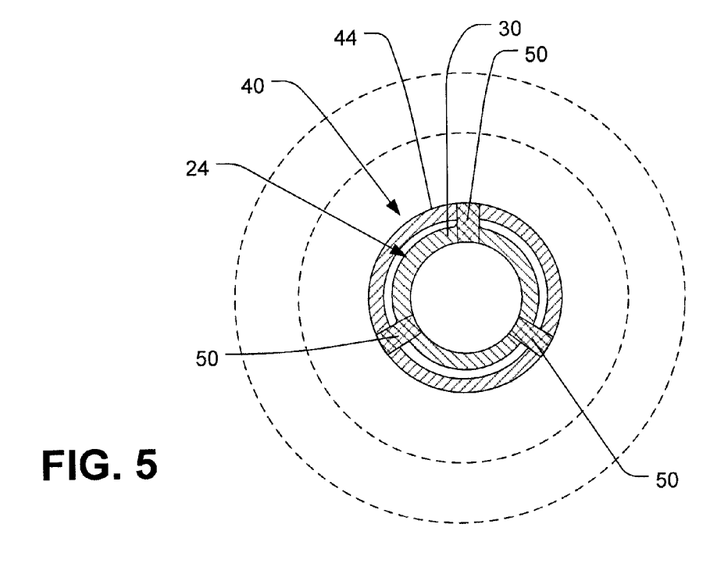
FIG. 5 is a schematic sectional view of the mount of FIG. 2 looking generally in the direction of arrows 5-5 in FIG. 2.

FIG. 5 shows a cross-sectional view of the mount 20 between the optical element 22 and the housing 24. When mounted together, the optical element 22 and the housing 24 are only in contact with one another in the areas 50 where the mounting pads 28, 42 are aligned. The contact areas 50 between the three mounting pads of the optical element 22 and the housing 24 form a semi-kinematic mount.

As shown in FIG. 5, the optical element connecting surface 20 is spaced or separated from the housing connecting surface 44 to avoid a ring contact or ring engagement between the optical element 22 and the housing 24. In the embodiment of FIG. 5, the connecting surface 30 of the optical element mount 26 is radially inward of the connecting surface 44 of the housing mount 40.

It will be appreciated that the configuration of the mounting pads and the connecting surfaces may be varied or changed from the illustrated embodiment. For example, the optical element mounting pads 28 may extend radially inward from the connecting surface 30 on the optical element 22, and the housing mounting pads 42 may extend radially outward from the connecting surface 44 on the housing 24. The areas 50 of contact between the optical element 22 and the housing 24, however, would be the same, e.g., the optical element mount 26 and the housing mount 40 would only be in contact with one another at the mounting pads 28, 42.

As mentioned above, the surfaces of the mounts 26, 40 are smooth surfaces, which may be optically smooth surfaces, highly reflective surfaces or mirror-like surfaces, etc., which are sufficiently smooth to be measured or inspected with an optical inspection system. For example, the surfaces of the mounts 26, 40 can be polished or finished with single point diamond turning (SDPT). It will be appreciated that other types of finishing may be used, such as fly-cut, lapped, etc. to form a surface with sufficient reflectivity and surface error/slope to be measurable with an interferometer. Such finishes are commonly referred to as "optical finishes" as will be appreciated by one of skill in the art.

As will be appreciated, the entire surface of the mounts 26, 40 can be fully characterized with an interferometer to allow for tighter controls and tolerances for the fabrication of the mounting surfaces. Furthermore, many or all of the surface errors can be identified by optical inspection and the surfaces can be further polished, ground, lapped or otherwise modified to meet the desired tolerance. It also will be appreciated that optical measurements are significantly faster than mechanical measurements. Additionally, optical measurements are made without contacting the mounting surfaces, and therefore softer materials, such as aluminum, are not scratched or damaged as they may be by mechanical measurement systems.

It will be appreciated that although the surfaces of the mounts 26, 40 are optically measurable, the surfaces still may be inspected or measured by mechanical measurement systems, for example, by a coordinate measuring machine (CMM), air bearing, or other mechanical systems. Mechanical measurement systems, however, are generally less accurate than optical or interferometric measurement systems. Thus, if the manufacturing tolerances meet or exceed those tolerances that can be accurately measured with a mechanical system, an optical system may be used.

Some characteristics of mounting systems that have separate mounting pads, for example, the separate mounting pads 12, 14, 16 of the element 10 of FIG. 1, cannot be inspected accurately with an optical inspection system. For example, while individual pads may be measured for tip/tilt, the relative axial position (i.e., piston or coplanarity) between the pads cannot be measured optically using an interferometer due to the separation or discontinuity between the mounting pads 12, 14, 16. As will be appreciated, an interferometer measures the height of one point on a surface relative to the height of an adjacent point on the surface rather than the absolute height of each point on the surface. Thus, while the interferometer may be used to accurately characterize the surface of each individual pad, the characterized surface cannot be related accurately to a non-connected surface.

As described above, the connecting surfaces 30, 44 between the mounting pads are continuous surfaces that link the mounting pads 28, 42 of each respective mount 26, 40. Thus, the mounting pads 28, 42 on each mount 26, 40 are parts of a single, continuous surface. The connecting surfaces 30, 44, therefore, facilitate the optical inspection of the mounting pads 28, 42 by providing a frame of reference between the respective mounting pads 28, 42 so that the planarity of the mounting pads 28, 42 relative to one another can be determined precisely and accurately.

By determining the coplanarity of the mounting pads 28, 42 with a high degree of accuracy and precision, the resulting position of the mounted optical element 22 can be determined, e.g., it can be determined whether the optical element 22 will be tilted or misaligned when mounted on the housing 24. The mounting pads 28, 42 on the respective elements 22, 24 can then be machined or otherwise modified to adjust the relative heights of the mounting pads 28, 42 to make them coplanar with one another and/or to achieve the desired position of the optical element 22 relative to the housing 24.

The optically measurable tolerances of the mounting pads can be increased over the prior art. For example, the mounting pads may be manufactured with a 50% tighter coplanarity tolerance than a traditional three-pad mount (FIG. 1). For example, if a traditional three-pad mount has a mechanically measureable coplanarity tolerance of 0.000050 inches, the mount having mounting pads connected with a continuous connecting surface may have a tolerance of 0.000025 inches. As will be appreciated, these tolerances are only exemplary in nature. It will be appreciated that different interferometers may have tighter or looser tolerances than those described in the exemplary embodiments herein.

Figure 6A:
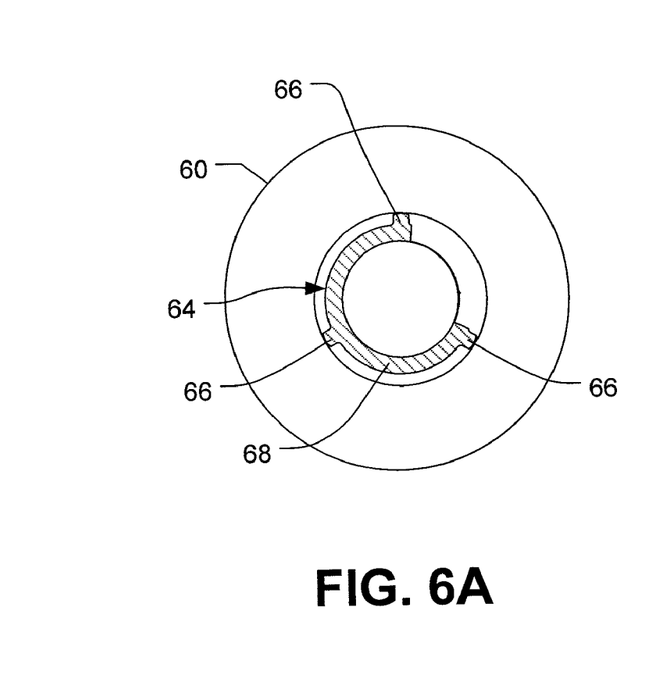
FIG. 6A is a plan view of an embodiment of an optical element according to aspects of the present invention.
Figure 6B:
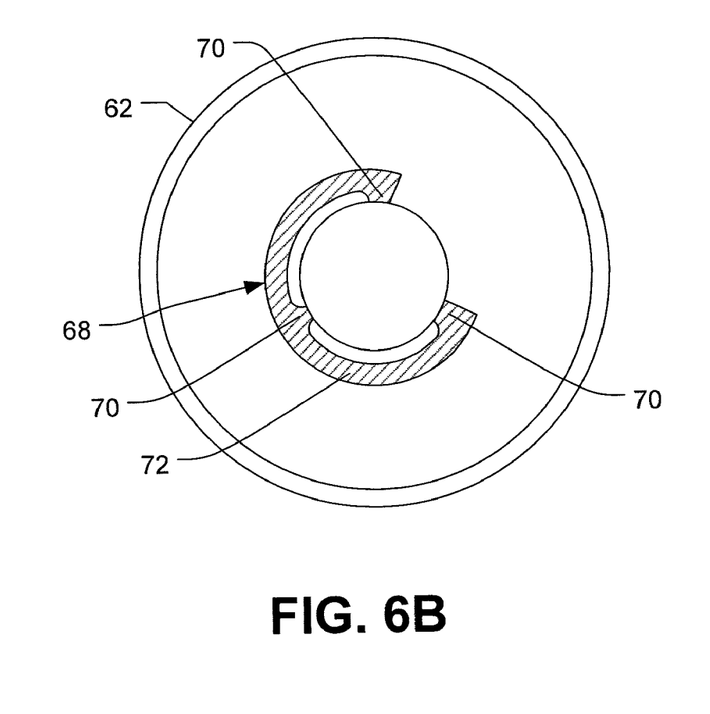
FIG. 6B is a plan view of an embodiment of a housing member according to aspects of the present invention.

Another embodiment of an optical element 60 and housing 62 is illustrated in FIGS. 6A-6B. Similar to the optical element 22 of FIG. 3, the optical element 60 has a mount 64 that includes plural optical element mounting pads 66 that are linked or connected together with an optical element connecting surface 68. The optical element mounting pads 66 and the optical element connecting surface 68 form a continuous surface that links the optical element mounting pads 66 to one another. In the embodiment of FIG. 6A, the connecting surface 68 is an open-end shape that is generally in the shape of a "C." As will be appreciated, other shaped connecting surfaces may be used to connect the mounting pads 66 with a continuous surface. As described above, the surface of the optical mount 64 is sufficiently smooth so that it can be optically inspected.

Similarly, the housing 62 includes a housing mount 69 that includes plural housing element mounting pads 70 connected or linked together with a housing element connecting surface 72. The housing connecting surface 72 also is an open-end shape that is generally in the shape of a "C." The housing mounting pads 70 and the housing connecting surface 72 form a continuous surface that can be optically inspected with an interferometer.

As described above, when mounted to one another, the mounting pads 66, 70 of each element 60, 62 are only in contact with one another at the mounting pads 66, 70. The connecting surfaces 68, 72 are spaced from one another. In the embodiment of FIGS. 6A-6B, the optical element connecting surface 68 is radially inward of the housing connecting surface 72. As will be appreciated the optical element 60 and the housing 62 may be aligned such that the open-end portions of the connecting surfaces 68, 72 are aligned or such that the open-end portions are offset from one another.

Figure 7A:
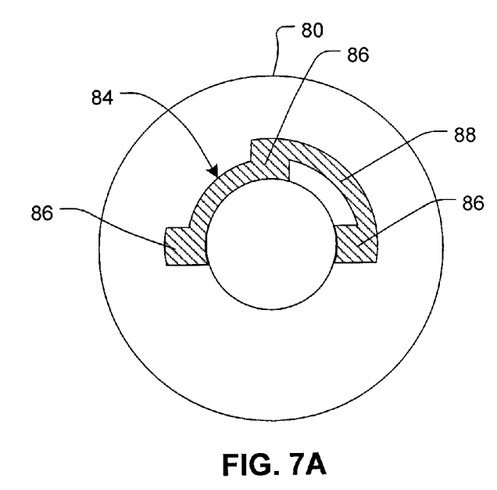
FIG. 7A is a plan view of an embodiment of an optical element according to aspects of the present invention.
Figure 7B:
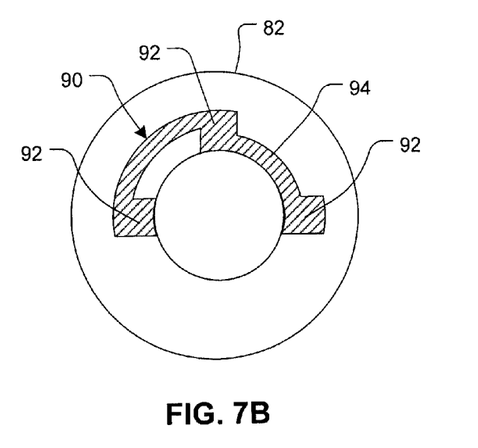
FIG. 7B is a plan view of an embodiment of a housing member according to aspects of the present invention.
Figure 7C:
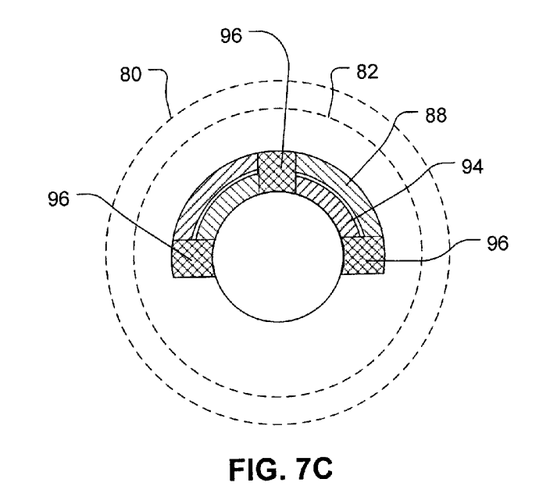
FIG. 7C is a schematic sectional view of a mount between the optical element of FIG. 7A and the housing member of FIG. 7B.

Another embodiment of an optical element 80 and the housing element 82 are shown in FIGS. 7A-7C. In this embodiment, the optical element 80 has an optical element mounting surface 84, which includes several optical element mounting pads 86 and an open-end optical element connecting surface 88. As described above, the optical element mount 84 is a smooth, continuous surface. Similarly, the housing element includes a housing element mount 90, which includes several housing element mounting pads 92 connected together with an open housing element connecting surface 94.

As shown in FIG. 7C, the optical element 80 and housing element 82 are mounted together such that only the mounting pads 86, 92 are in contact with one another. The optical element mounting pads 86 and the housing element mounting pads 92 are in contact with one another at contact areas 96, while the optical element connecting surface 88 and the housing element connecting surface 94 are spaced from one another.

It will be appreciated that the connecting surfaces between the mounting pads may have a shape other than those shapes described above. For example, the connecting surfaces may be oval, triangular, rectangular, polygonal or a combination of different shapes. The mounting pads may extend from the connecting surface in any desired configuration such that the connection between the elements is limited to the areas of contact between the mounting pads. Furthermore, it will be appreciated that more than three mounting pads may be included on one or both of the optical element and housing element.

Figures 8, 9, 10:
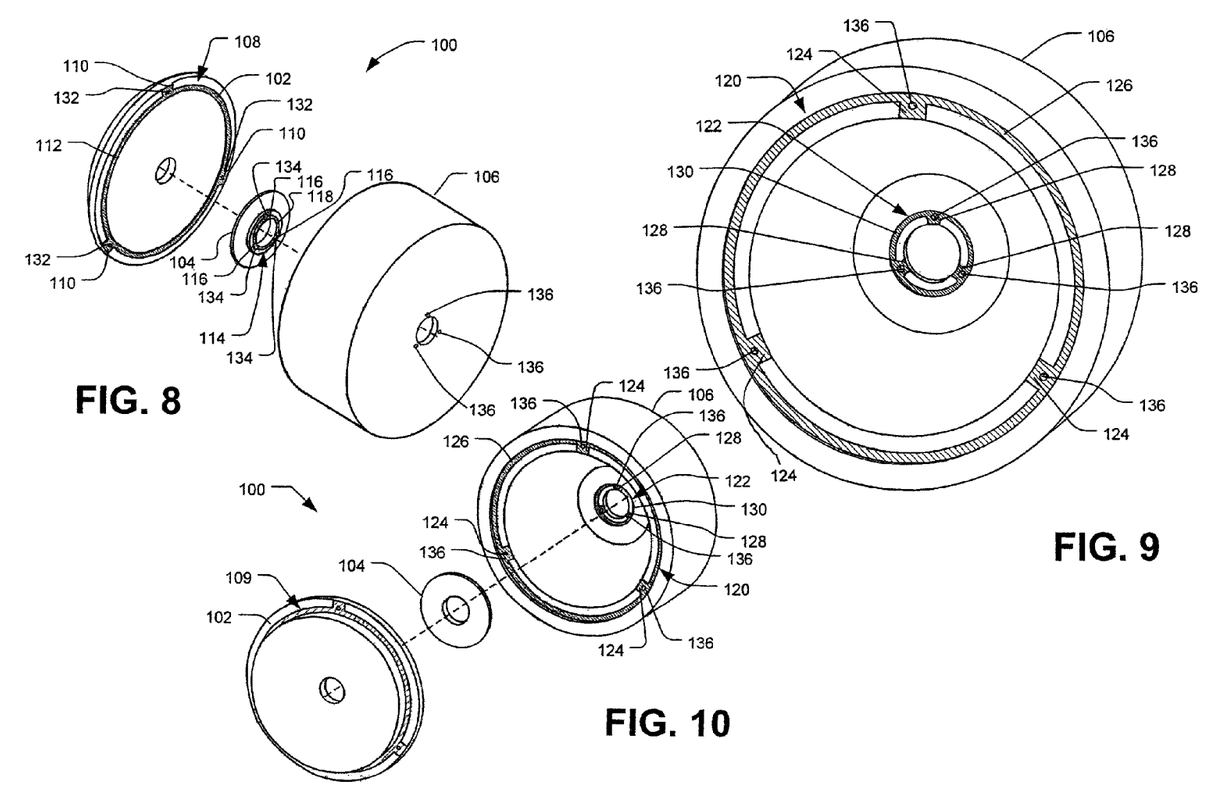
FIG. 8 is an exploded view of an embodiment of a mount according to aspects of the present invention.
FIG. 9 is an isometric view of a housing element in the mount of FIG. 8.
FIG. 10 is an exploded view of the mount of FIG. 8.

An exploded view of an embodiment 100 of two optical elements 102, 104 mounted to a housing 106 is shown in FIG. 8.

The first optical element 102 includes a first optical element mount 108 that has three mounting pads 110 connected or linked by a first optical element connecting surface 112. As described above, the first optical element mounting pads 110 and the first optical element connecting surface 112 form a continuous and substantially planar surface for mounting the first optical element 102 to the housing 106. The first optical element mount 108 is located generally on the periphery of the first optical element 102 rather than in around a center portion of the optical element 22 shown in FIGS. 2-3 and described above.

The second optical element 104 is substantially similar to the optical element 22 described above with respect to FIGS. 2-3. The second optical element 104 includes a second optical element mount 114 that includes three second optical element mounting pads 116 that are linked together by a second optical element connecting surface 118.

The housing 106 is shown in more detail in FIG. 9. The housing 106 includes a first housing mount 120 and a second housing mount 122. The first housing mount 120 includes a set of three first housing mount mounting pads 124 connected by a connecting surface 126. The second housing mount 122 includes a set of three second housing mount mounting pads 128 connected by a connecting surface 130. The first housing mount 120 and the second housing mount 122 each have a continuous and substantially planar surface that is optically measurable, as described above.

The first optical element 102 is mounted to the housing 106 at the mounting pads 110, 124 of each respective mount 108, 120. Similarly, the second optical element 104 is mounted to the housing 106 at the mounting pads 118, 128 of each respective mount 114, 122. As described above, the connecting surfaces the mounts between the optical elements 102, 104 and the housing 106 are radially separated from one another such that only the mounting pads of the respective mounts are in contact.

Referring to FIG. 10, an exploded view of the embodiment of FIG. 8 is shown from a different perspective. As shown in FIG. 10, the first optical element 102 may include a concave optical element, such as a concave mirror or lens. Similarly, the second optical element 104 may be a mirror, lens or other optical element. As shown in FIG. 10, the first optical element 102 may include another mounting surface 109 for mounting the optical element 102 to another element in the system.

The mounts on the optical elements 102, 104 and the housing 106 also may include holes through which a mechanical restraint or fastener may be inserted to secure the optical elements 102, 104 to the housing 106. The first optical element 102 includes a hole 132 through each mounting pad 110 on the first optical element mount 108. Similarly, the second optical element 104 includes a hole 134 through each mounting pad 116 in the second optical element mount 114. The housing 106 includes holes 136 through the mounting pads 124 in the first housing mount 120 and holes 136 through the mounting pads 128 in the second housing mount 122.

When the first optical element 102 is mounted to the housing 106, the holes 132 in the first optical element mount 108 align with the holes 136 in the first housing mount 120. Similarly, the holes 134 in the second optical element mount 114 align with the holes 136 in the second housing mount 122. At least some of the holes may be threaded, and a mechanical fastener or restraint, such as a screw or bolt, can be inserted through the holes to secure the optical elements 102, 104 to the housing 106 in any desired position. It will be appreciated that although illustrated as holes, the elements may be connected in any conventional means, for example, by bonding them together, clamping them together, etc., as will be appreciated by one of skill in the art.

As described above, the connecting surface of each element 102, 104, 106 form a continuous surface with the mounting pads of each mount. The continuous surface is optically measurable and therefore, the mounts can be manufactured with tighter tolerances than mounts that are limited to mechanically measurable tolerances.

Figures 11, 12:
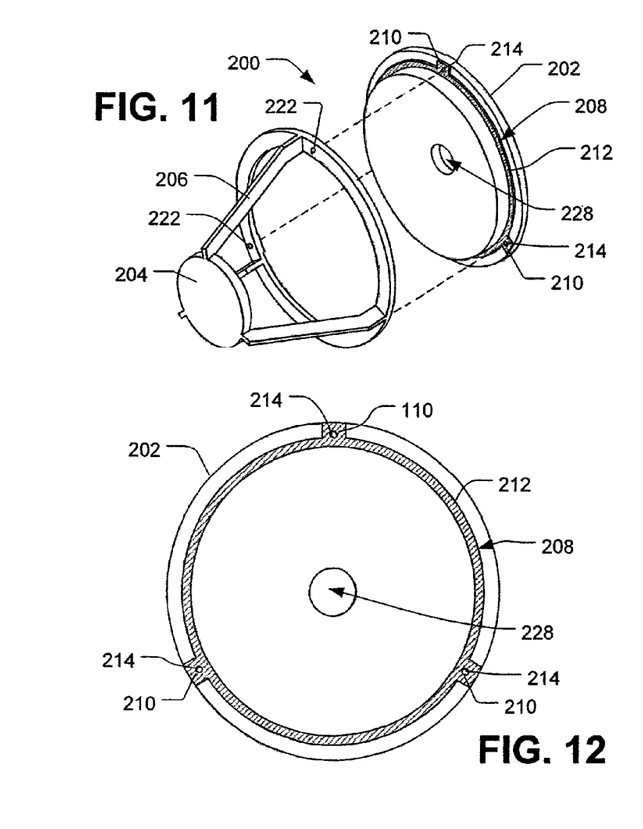
FIG. 11 is an exploded view of an embodiment of a mount between a primary optical element and a secondary optical element according to aspects of the present invention.
FIG. 12 is an isometric view of the primary optical element of the mount of FIG. 11.

Referring to FIG. 11, an exploded view of an embodiment of a mount 200 between a primary mirror 202 and a secondary mirror 204 is shown.

The primary mirror 202 is shown in more detail in FIG. 12. The primary mirror may be the same as element 102, as described above with respect to FIG. 8. The primary mirror 202 includes a primary mirror mount 208. The primary mirror mount 208 has a set of three axisymmetric primary mirror mounting pads 210 that are linked by a connecting surface 212. Each primary mirror mounting pad 210 includes a hole 214, which may be threaded and which may be used to mount the primary mirror 202 to the secondary mirror support 206. As described above, the primary mirror mounting pads 210 and the connecting surface 212 form a continuous and substantially planar surface that is optically measurable.

Figures 13, 14:
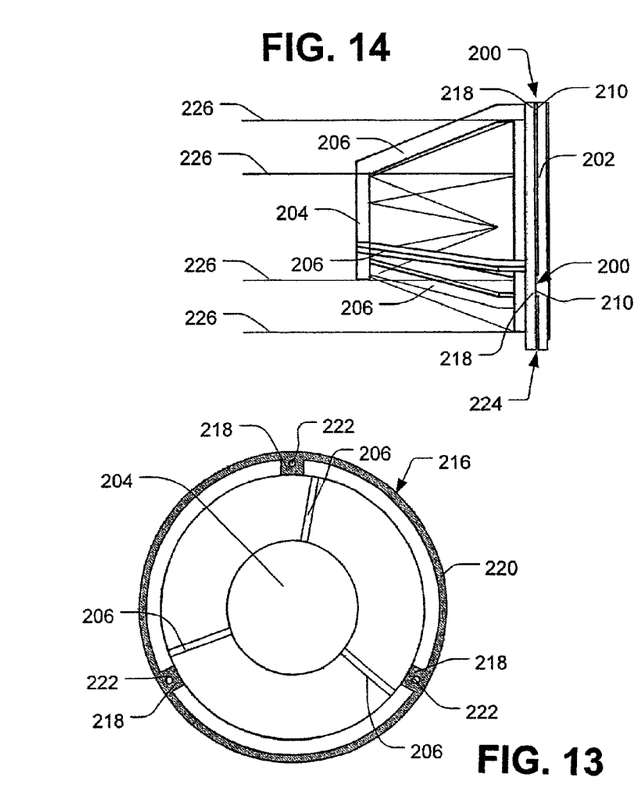
FIG. 13 is an isometric view of the secondary optical element of the mount of FIG. 11.
FIG. 14 is a side view of the mount of FIG. 11.

Referring to FIG. 13, the secondary mirror support 206 includes a support mount 216 with a set of three axisymmetric mounting pads 218 linked by a connecting surface 220. The mounting pads 218 and connecting surface 220 form a continuous and substantially planar surface that is optically measurable. Each mounting pad 218 includes a hole 222 through which a bolt or other restraint may be inserted to mount the secondary mirror support 206 to the primary mirror mount 208.

With additional reference to FIG. 14, a side view of the mount of FIG. 11 is shown. The primary mirror 202 and the secondary mirror 204 are mounted at the primary mirror mount 208 and the secondary mirror mount 216 such that only the mounting pads 210, 218 of the respective mounts 208, 216 are in contact with one another and the connecting surfaces 212, 220 are spaced from one another. Thus, as shown at 200 in FIG. 14, the primary mirror mounting pads 210 are in contact with the support mounting pads 218. There is a space, indicated generally by space 224, between primary mirror connecting surface 212 and the support connecting surface 220.

FIG. 14 also illustrates an exemplary path of optical rays 226. As shown in FIG. 14, the optical rays 226 reflect off of the primary mirror 202, which is a concave mirror. The optical rays 226 are reflected to the secondary mirror 204, which is a flat mirror. As a result of the concave mirror 202 and the flat mirror 204, the optical rays 226 are reflected through a hole 228 in the primary mirror 202 (shown in FIGS. 11 and 12). Although illustrated as a hole 228, it will be appreciated that the optical rays 226 may be directed to a focal point or to another portion of an optical instrument, etc.

A mount according to the aspects described herein allows for the manufacture of mounts that can be manufactured at tighter tolerances than mechanically measured mounts. Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical mount comprising:
   an optical element including a substantially planar optical element mount that further includes both plural optical element mounting pads and an optical element connecting surface that links the optical element mounting pads together, the optical element mounting pads each having a surface that is coplanar with the optical element connecting surface;
   a housing including a substantially planar housing mount that further includes both plural housing mounting pads and a housing connecting surface that links the mounting pads together, the housing mounting pads each having a surface that is coplanar with the housing connecting surface;
   wherein the optical element mount is in contact with the housing mount and the contact between the optical element mount and the housing mount only occurs at the mounting pads.

2. The optical mount of claim 1, wherein one of the connecting surfaces is radially inward of the other connecting surface.

3. The optical mount of claim 2, wherein the mounting pads of one of the connecting surfaces extend radially inward from the connecting surface; and
   wherein the mounting pads on the other connecting surface extend radially outward from the other connecting surface.

4. The optical mount of claim 3, wherein the plural optical element mounting pads include at least three optical element mounting pads; and
   wherein the housing element mounting pads include at least three housing element mounting pads.

5. The optical mount of claim 3, wherein the optical element connecting surface is an optical element connecting annulus; and
   wherein the plural housing element connecting surface is a housing element connecting annulus.

6. The optical mount of claim 5, wherein the optical element mounting pads are axisymmetrically spaced around the optical element connecting annulus; and
   wherein the housing element mounting pads are axisymmetrically spaced around the housing element connecting annulus.

7. The optical mount of claim 1, wherein the optical element mount is a continuous monolithic piece of material; and
   wherein the housing mount is a continuous monolithic piece of material.

8. The optical mount of claim 1, wherein the optical element mount is an optically measurable surface; and
   wherein the housing element mount is an optically measurable surface.

9. A mount comprising:
   a mounting element that includes a plurality of mounting element mounting pads connected by a mounting element connecting surface, wherein the mounting element connecting surface and the plurality of mounting element mounting pads together form a substantially planar continuous surface; and
   a housing element that includes a plurality of housing element mounting pads connected by a housing element connecting surface, wherein the housing element connecting surface and the plurality of housing element mounting pads together form a substantially planar continuous surface;
   wherein the mounting element mounting pads are in contact with the housing element mounting pads, and the mounting element connecting surface is spaced from the housing element connecting surface.

10. The mount of claim 9, wherein the surface of the mounting element connecting surface and mounting element mounting pads have an optical finish; and
    wherein the housing element connecting surface and housing element mounting pads have an optical finish.

11. The mount of claim 9, wherein the mounting element connecting surface comprises a mounting annulus; and
    wherein the housing element connecting surface comprises a housing annulus.

12. The mount of claim 11, wherein one of the annuli is radially inward of the other of the annuli.

13. The mount of claim 12, wherein the mounting element mounting pads extend radially outward from the mounting element annulus; and
    wherein the housing element mounting pads extend radially inward from the housing element annulus.

14. The mount of claim 9, wherein the plurality of mounting element mounting pads comprises three mounting element mounting pads; and
    wherein the plurality of housing element mounting pads comprises three housing element mounting pads.

15. The mount of claim 14, wherein the mounting element comprises an optical element.

16. The mount of claim 15, wherein the optical element is a mirror or a lens.

17. The mount of claim 14, wherein the mount between the mounting element and the housing element comprises a semi-kinematic mount.

18. The mount of claim 9, further comprising a second mounting element that includes a plurality of second mounting element mounting pads connected by an second mounting element connecting surface, wherein the second mounting element connecting surface and the plurality of second mounting element mounting pads form a substantially continuous surface;
    wherein the housing element further comprises a second plurality of housing element mounting pads connected by an second housing element connecting surface, wherein the second housing element connecting surface and the second housing element mounting pads form a substantially continuous surface, and
    wherein the second mounting element mounting pads are in contact with the second housing element mounting pads, and the second mounting element connecting surface is spaced from the second housing element connecting surface.

19. A semi-kinematic mount comprising:
- a housing having a substantially planar housing mount surface that includes a plurality of housing mounting pads, each housing mounting pad having a surface that is coplanar with the corresponding surfaces of the other housing mounting pads and other portions of the housing mount surface; and
- an optical element having a substantially planar mounting surface that includes a plurality of optical element mounting pads, each optical element mounting pad having a surface that is coplanar with the surfaces of the other optical element mounting pads and other portions of the optical element mounting surface;
- wherein the housing mounting pads and the optical element mounting pads are in contact with one another when the optical element is mounted to the housing.

20. The semi-kinematic mount of claim 19, wherein the housing mount has a highly reflective surface; and
wherein the optical element mount has a highly reflective surface.

21. The semi-kinematic mount of claim 19, wherein the housing mount has an optical finish; and
wherein the optical element mount has an optical finish.

22. The semi-kinematic mount of claim 19, wherein at least one of the housing mount or the optical element mount has an open-end shape.

23. The semi-kinematic mount of claim 19, wherein the housing mount is an annular surface; and
wherein the optical element mount includes an annular surface.

24. The semi-kinematic mount of claim 23, wherein one annular surface is radially inward of the other annular surface.

25. An optical mount comprising:
- an optical element that includes an optical element mount comprising plural optical element mounting pads and an optical element connecting surface that links the optical element mounting pads together, the optical element mounting pads having a surface the is coplanar with the optical element connecting surface;
- a housing that includes a housing mount comprising plural housing mounting pads and a housing connecting surface that links the mounting pads together, the housing mounting pads having a surface that is coplanar with the housing connecting surface;
- wherein the optical element mount is in contact with the housing mount and the contact between the optical element mount and the housing mount only occurs at the mounting pads; and
- wherein at least one of the optical element mount or housing element mount is an optically measurable surface.

* * * * *